No. 655,613. Patented Aug. 7, 1900.
G. DONGES.
BEER COOLER.
(Application filed Jan. 18, 1900.)
(No Model.)
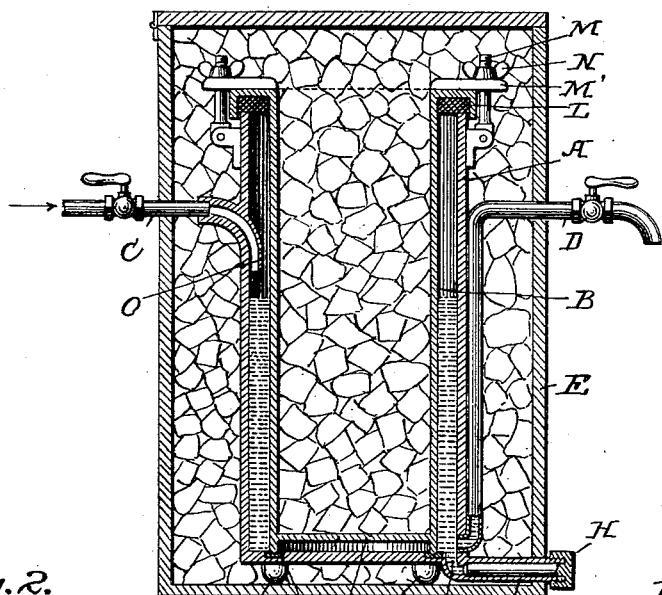
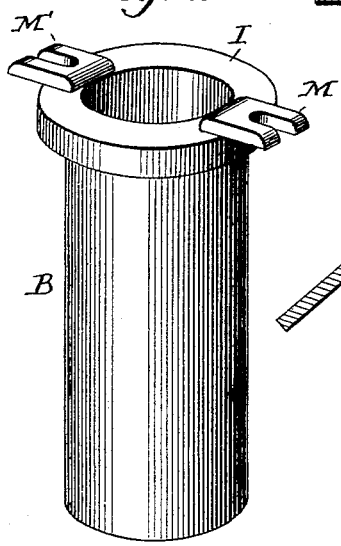
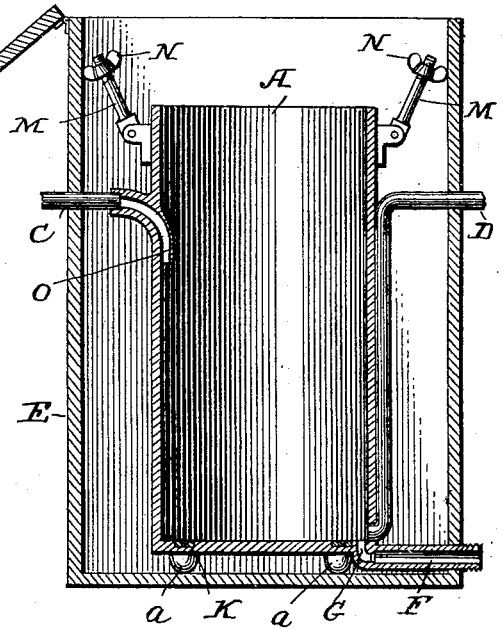
Witnesses
J. G. Hinkel
Arthur L. Bryant
Inventor
George Donges
by Watson & Watson
Attorneys

UNITED STATES PATENT OFFICE.

GEORGE DONGES, OF BALTIMORE, MARYLAND.

BEER-COOLER.

SPECIFICATION forming part of Letters Patent No. 655,613, dated August 7, 1900.

Application filed January 18, 1900. Serial No. 1,915. (No model.)

*To all whom it may concern:*

Be it known that I, GEORGE DONGES, a citizen of the United States, residing at the city of Baltimore, in the State of Maryland, have invented certain new and useful Improvements in Beer-Coolers, of which the following is a specification.

My present invention relates to improvements in coolers for circulating fluids; and one of the objects of the invention is to provide a device for this purpose which will be effective in operation and which can be readily and thoroughly cleaned.

Another object of the invention is to provide an apparatus particularly adapted for cooling beer, which will have its parts so arranged that the collection of any considerable quantity of impure or stale beer about the outlet will be prevented.

With these and other ends in view my invention consists in the peculiar construction and arrangement of parts that will be hereinafter described.

In the accompanying drawings, Figure 1 is a vertical sectional view of a cooling apparatus embodying my improvements. Fig. 2 is a view of the inner removable casing of the apparatus. Fig. 3 is a vertical sectional view of the apparatus, the inner casing or cylinder being withdrawn to permit of cleaning the outer cylinder. Fig. 4 is a detail view of the waste-duct valve.

Like letters of reference designate corresponding parts in the several figures of the drawings, referring to which—

A B designate the two shells or casings which form the body of my improved cooler. These cases are, as shown in the drawings, preferably made cylindrical in form and may be of any suitable size. The casing B is of less diameter than the outer casing, within which it is secured when the apparatus is in use, so as to provide an annular liquid chamber or space between the vertical walls of said casings.

The outer casing A is preferably secured permanently within an ice-box, and to it are connected the inlet and discharge-pipes C D, through which the liquid to be cooled is conducted to and withdrawn from the annular cooling chamber above referred to, and which pipes extend through the walls of the inclosing ice-box E. This ice-box may be of any suitable and desirable form and construction and is illustrated conventionally only in the accompanying drawings. The inlet or supply pipe C preferably opens into the said cooling-chamber some distance above the bottom thereof, while the delivery-pipe communicates with an opening formed in the vertical wall of the outer casing A at the lower end thereof. The outer casing is provided with a waste pipe or duct F, which extends from an aperture G, formed in the bottom of said casing, through one of the walls of the inclosing ice-box. To provide for this waste-pipe, the cooling-chamber is elevated or raised somewhat above the bottom of the ice-box, the outer casing A being provided with suitable feet-depending projections $a$.

The waste duct or pipe is closed by a valve H, which has an enlarged head adapted to surround and engage with the projecting end of said pipe and has an elongated stem or body which is adapted to have its inner end forced against a suitable seat formed therein.

The inner removable casing B is provided at its upper end with an annular flange I, which is of such form and size as to extend across and entirely cover the upper end of the liquid-chamber. The vertical wall of the inner casing B extends somewhat below the bottom or horizontal ice-support $b$ therein, and to form a fluid-tight joint between said casings at the lower end of the liquid-chamber an annulus or ring K, of suitable packing material, is seated in a groove formed in the upper surface of the bottom of the outer casing, against which ring the lower end of the inner casing is firmly held when the parts are assembled for use. A somewhat similar packing-ring L is arranged within a groove or channel formed in the lower face of the flange at the upper end of the inner casing and extends across and receives the upper edge of the outer casing when the inner casing is placed therein.

The two casings A B are firmly clamped together by means of binding-screws M, which are pivotally connected to the outer casing and adapted to extend upwardly through slotted lugs M′, formed in the inner casing, and clamping-nuts N.

The manner of using and the advantages possessed by my apparatus will be readily understood and appreciated from the above description and the drawings.

When the two casings A B are secured together, as indicated in Fig. 1, a cylindrical liquid-chamber is formed which may be completely surrounded by ice arranged within the ice-box E and the inner removable casing B.

Preferably to prevent foaming of beer in the cooling-chamber I arrange a shield or deflecting-plate O at the inner end of the inlet-pipe C, said plate causing the liquid entering the chamber to flow downwardly close to the outer wall thereof. It will be noticed that the inner end of the waste pipe or duct F forms a sediment-receptacle below the aperture G and immediately adjacent to the lower end of the discharge-pipe D. Such sediment-receptacle, however, is of such size that only a very small amount of liquid can collect therein. This is of importance in beer-coolers, where if any considerable quantity of stale beer is allowed to accumulate all of the contents of the cooling-chamber are rapidly affected.

When it is desired to clean the apparatus, the liquid in the cooling-chamber is first withdrawn and then the two casings A B are disconnected and the latter removed from the outer stationary one. The valve H is then removed, and the outer casing A can be easily and thoroughly cleansed without being moved from its position in the ice-box. The construction of this valve H is such that liquid passing through the waste-duct does not come into contact with and therefore cannot damage the threaded joint by which said valve is connected with said duct when in operative position—that is, as has been hereinbefore described and as is illustrated in detail in Fig. 4, the end of the waste-duct that projects beyond the ice-box is provided with a series of external threads, and the enlarged head of the valve H is provided with a channel or groove to receive the projecting end of said waste-duct. A suitable thread is formed on the inner surface of the outer wall of this channel or groove in the head of the valve H and is adapted to engage with the aforesaid thread in the waste-duct. When the inner casing B is removed, the ice contained therein is also withdrawn, and said casing can be easily cleaned both on its interior and exterior surfaces.

From the above description and the drawings it will be seen that I have provided a very simple and efficient beer-cooling apparatus. By employing the inner shell or casing B as an ice-receptacle I am enabled to apply ice directly to both walls of the liquid-chamber. Another important advantage incident to my construction is the ease with which the liquid-chamber can be cleaned. By simply removing the inner casing B the entire chamber is exposed, and water employed for cleaning can be readily drawn off through the waste F. It will be seen that with my construction it is unnecessary when cleaning the apparatus to remove or in any way adjust the outer casing A, which is ordinarily and preferably permanently secured within the ice-box E.

Having thus described my invention, what I claim as new, and desire to secure by Letters Patent, is—

1. In a beer-cooling apparatus, the combination, of two casings, arranged one within the other, supply and delivery pipes communicating with the liquid-chamber formed between said casings, a waste duct or pipe communicating with said chamber and having an interior, transverse, valve-seat arranged relatively near its point of communication with said chamber, and a valve consisting of a stem, adapted to enter said duct and have its inner end seated against the valve-seat therein, and an enlarged head adapted to surround the outer end of said duct.

2. In a beer-cooling apparatus, the combination, of a cooling-chamber, an ice-box surrounding said chamber, inlet and delivery pipes communicating with the cooling-chamber and extending beyond the inclosing ice-box, a waste-duct leading from the cooling-chamber through a wall of the ice-box and having an internal valve-seat near its inner end, and a valve having an enlarged head, provided with an internally-threaded groove or chamber to receive and engage the outer end of the waste-duct, and a reduced stem adapted to enter said duct and have its inner end seated against the valve-seat therein, substantially as and for the purpose described.

3. The herein-described beer-cooling apparatus, consisting of an ice-box, a shell or casing, open at its upper end, arranged within the ice-box, a second casing, having a central ice chamber or receptacle, arranged within the first said casing and having at its upper end a flange adapted to extend across the space separating said casings, means arranged outside of said casings for detachably connecting them together, whereby the inner casing and the ice carried thereby may be removed without affecting the outer casing, inlet and delivery pipes extending from the liquid-chamber formed between said casings through walls of the inclosing ice-box, a waste-duct extending from said liquid-chamber through a wall of the ice-box and having an internal valve-seat adjacent to said liquid-chamber, and a valve having a stem adapted to extend from said valve-seat to the outer end of the waste-duct.

In testimony whereof I affix my signature in presence of two witnesses.

GEORGE DONGES.

Witnesses:
HENRY PETESCH,
LOUIS DONGES.